United States Patent [19]
Wade et al.

[11] Patent Number: 5,033,490
[45] Date of Patent: Jul. 23, 1991

[54] CAR WASH ADJUSTABLE TO CAR SIZE

[76] Inventors: Jerry D. Wade; Phillip H. Geisler, both of Rt. 2, Box 117, Galena, Kans. 66739

[21] Appl. No.: 484,077

[22] Filed: Feb. 23, 1990

[51] Int. Cl.⁵ ............................................. B60S 3/04
[52] U.S. Cl. .................................................. 134/123
[58] Field of Search ........................ 134/45, 57 R, 123

[56] References Cited

U.S. PATENT DOCUMENTS

| | | | |
|---|---|---|---|
| 3,339,563 | 9/1967 | Ordonez | 134/123 X |
| 3,650,281 | 3/1972 | Hurst | 134/123 X |
| 3,759,275 | 9/1973 | Walters | 134/45 |
| 4,809,720 | 3/1989 | Heraty | 134/123 X |
| 4,865,058 | 9/1989 | Crotts et al. | 134/123 X |

FOREIGN PATENT DOCUMENTS

| | | | |
|---|---|---|---|
| 1953027 | 5/1970 | Fed. Rep. of Germany | 134/123 |
| 0151156 | 8/1985 | Japan | 134/123 |

Primary Examiner—Philip R. Coe
Attorney, Agent, or Firm—Fleit, Jacobson, Cohn, Price, Holman & Stern

[57] ABSTRACT

A car or vehicle washing device utilizing high pressure cleaning solution being discharged through a plurality of nozzles onto the surfaces of the vehicle to be washed with the nozzles being supported on spray booms or bridges that are adjustable so the nozzles will be oriented in optimum spatial relation to the surfaces of the vehicle being washed thereby enabling different sizes of vehicles to be effectively washed by the apparatus of this invention.

8 Claims, 4 Drawing Sheets

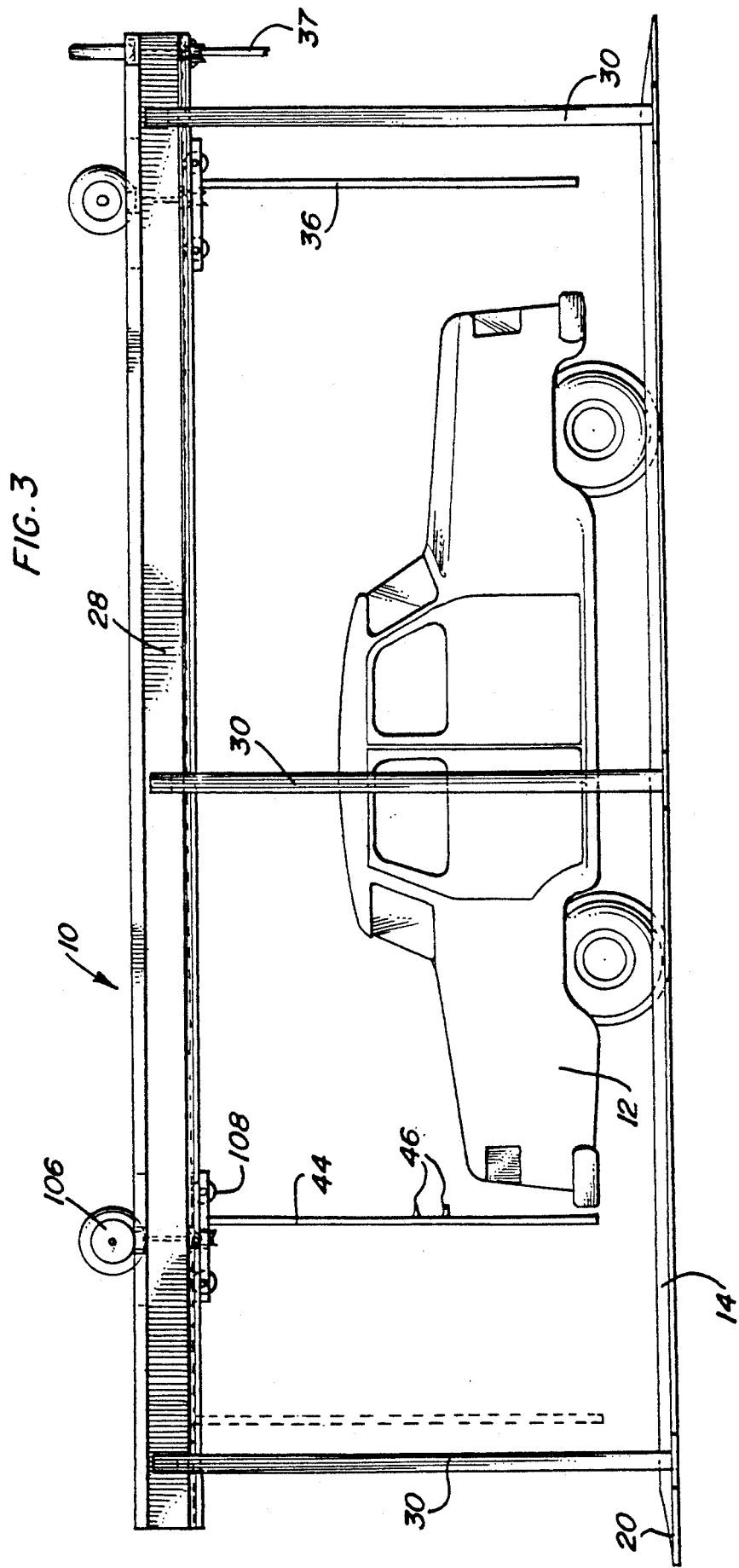

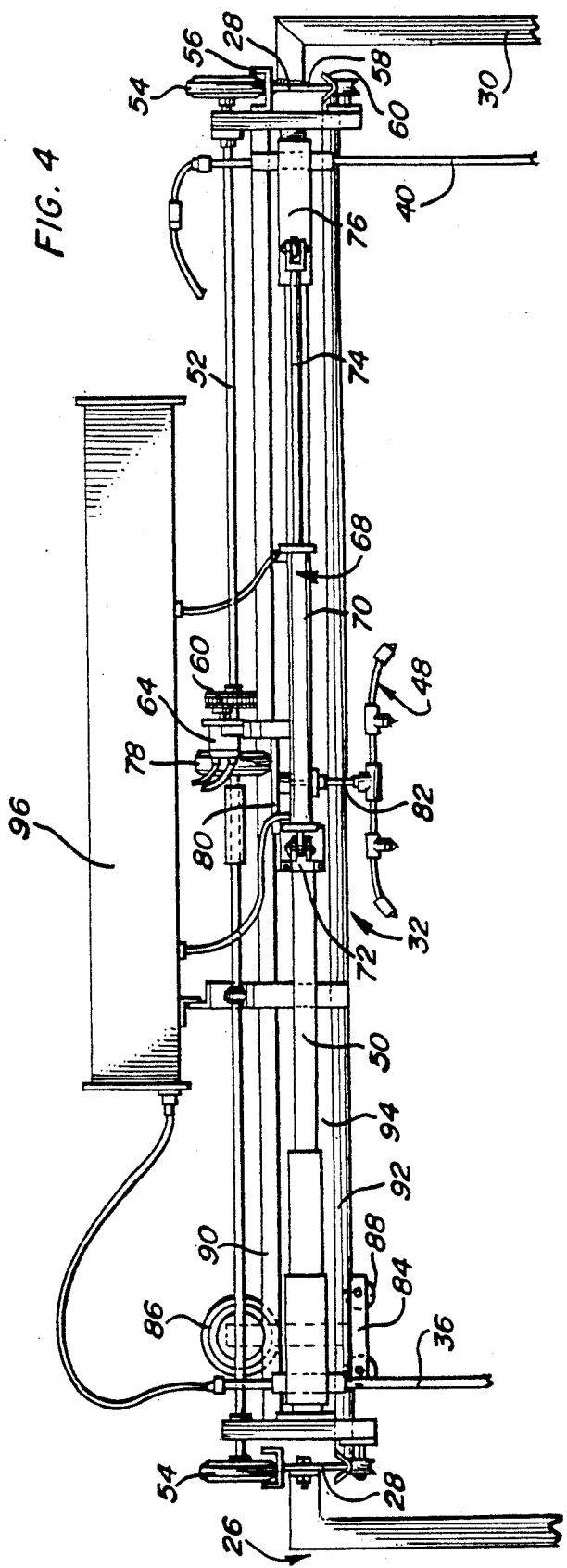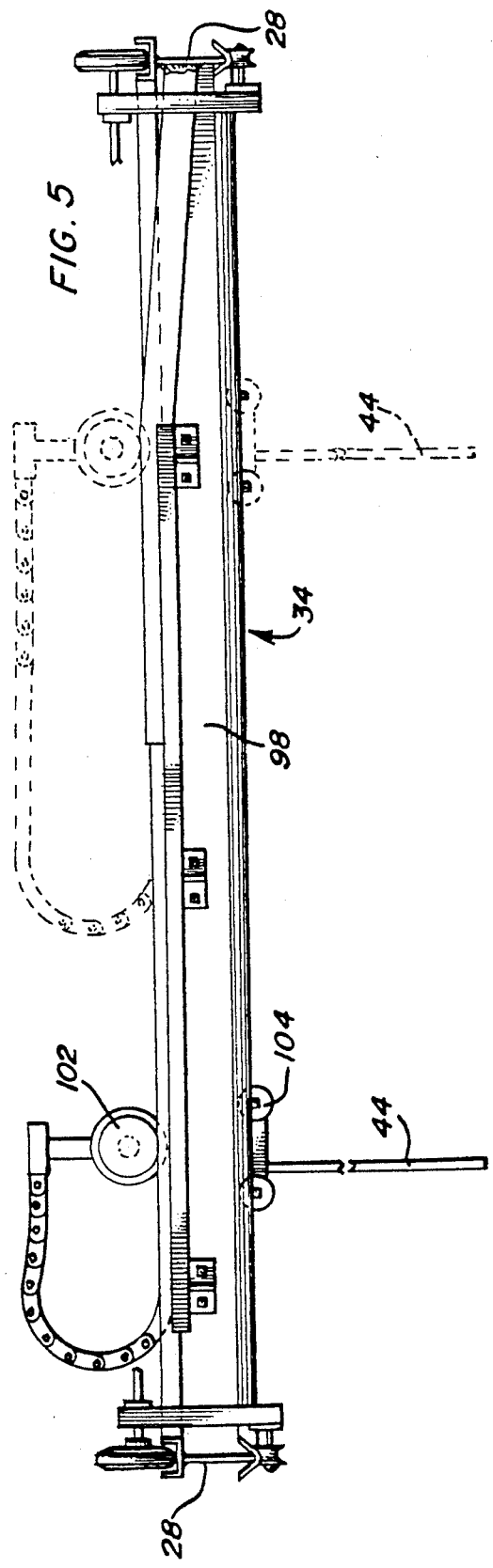

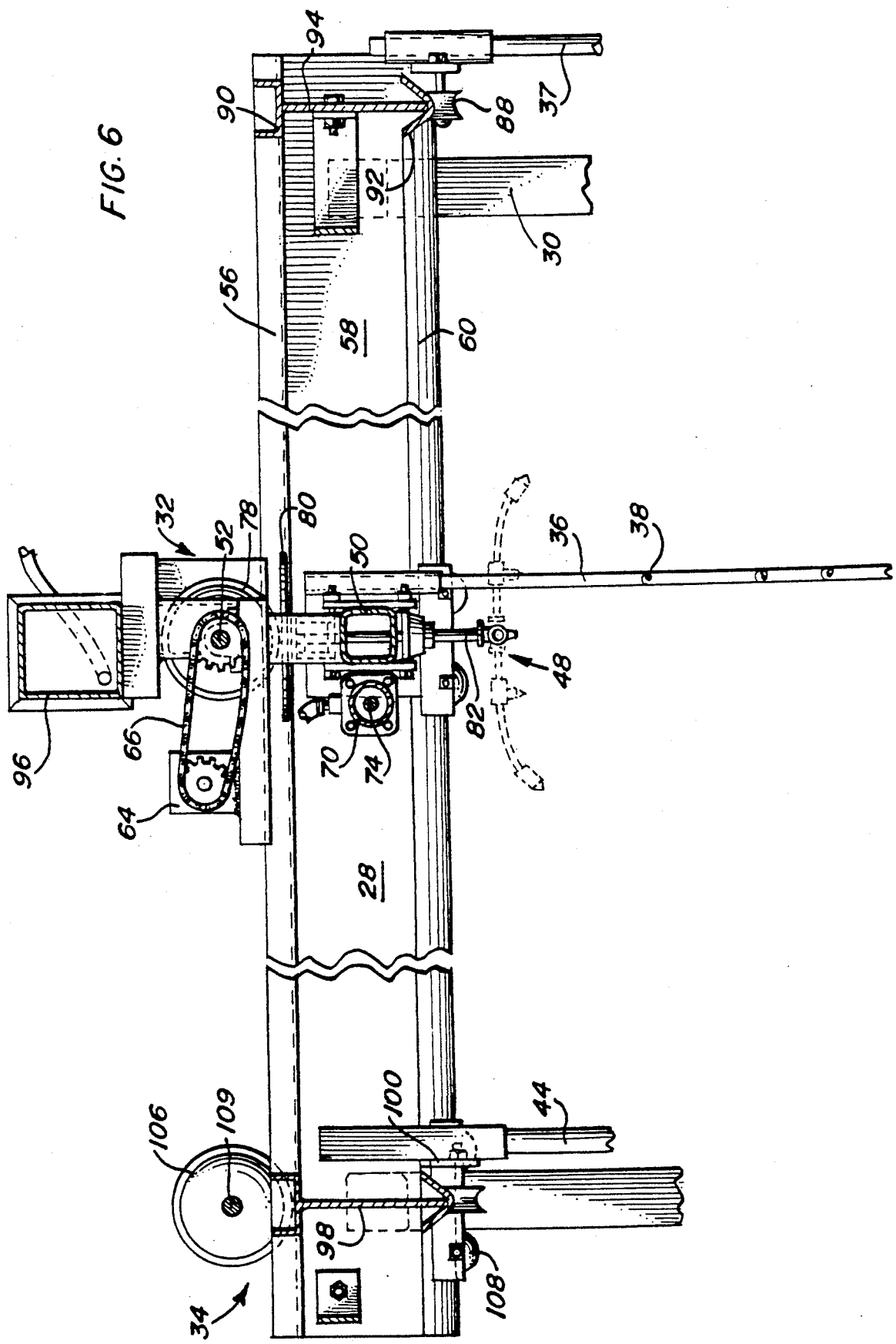

CAR WASH ADJUSTABLE TO CAR SIZE

BACKGROUND OF THE INVENTION

1. Field of the Invention

The present invention generally relates to a car or vehicle washing device and more particularly to a car or vehicle washing device utilizing high pressure cleaning solution being discharged through a plurality of nozzles onto the surfaces of the vehicle to be washed with the nozzles being supported on spray booms or bridges that are adjustable so the nozzles will be oriented in optimum spatial relation to the surfaces of the vehicle being washed thereby enabling different sizes of vehicles to be effectively washed by the apparatus of this invention.

2. Information Disclosure Statement

Apparatuses for washing vehicles such as automobiles and the like are well known and generally categorized as brush type or high pressure spray type in which the vehicle is moved through a tunnel or remains stationary while the washing apparatus moves in relation to the vehicle. The following U.S. patents relate to vehicle washing apparatuses and particularly the high pressure type in which liquid cleaning solution is discharged through a plurality of nozzles onto the surfaces of the vehicle for cleaning those surfaces:

2,756,759
3,012,564
3,024,795
3,072,130
3,259,138
3,339,563

While the above listed patents disclose various high pressure washing apparatuses and various arrangements of the movable nozzles, one of the on-going problems is the loss of efficiency of the cleaning operation when a nozzle arrangement oriented for effectively washing a full-size vehicle is used to wash a compact or subcompact vehicle since the nozzles are then spaced too far away from the small vehicle to effectively wash the surfaces.

SUMMARY OF THE INVENTION

An object of the present invention is to provide a car or vehicle washing apparatus utilizing high pressure discharge nozzles for cleaning solution supported on spray booms or bridges for movement in relation to a stationarily positioned vehicle including structural arrangements enabling the spray nozzle orientation to be adjusted in response to the external dimensional characteristics of the vehicle being washed so the spray nozzles will be in optimum relation to the surfaces of different sizes of vehicles thereby maintaining the efficiency of the washing operation regardless of the size of the vehicle being washed.

Another object of the invention is to provide a car or vehicle washing apparatus in accordance with the preceding object in which one side and one end of the vehicle are guided into optimum predetermined relation to spray nozzles oriented in predetermined relation to one side and one end of the vehicle with other spray nozzles orientated in adjustable relation to the other side of the vehicle and the other end of the vehicle, respectively, so the adjustable spray nozzles may be positioned in optimum spaced relation to the other side and other end of the vehicle for most efficient cleaning of the vehicle surfaces.

A further object of the invention is to provide a car or vehicle washing apparatus in accordance with the preceding objects in which sensing devices determine the size of the vehicle to be washed and adjust the movable spray booms and nozzles in a manner to "fit" the washing apparatus to the vehicle to provide efficient cleaning of the surfaces being washed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a side elevational view of the structure illustrated in FIGS. 1 and 2.

FIG. 4 is a detailed view of the front wash bridge.

FIG. 5 is an elevational view of the rear wash bridge illustrating the movement of the rear spray nozzle boom or wand.

FIG. 6 is a sectional view of certain components of the invention.

DESCRIPTION OF THE PREFERRED EMBODIMENT

Figure 1:
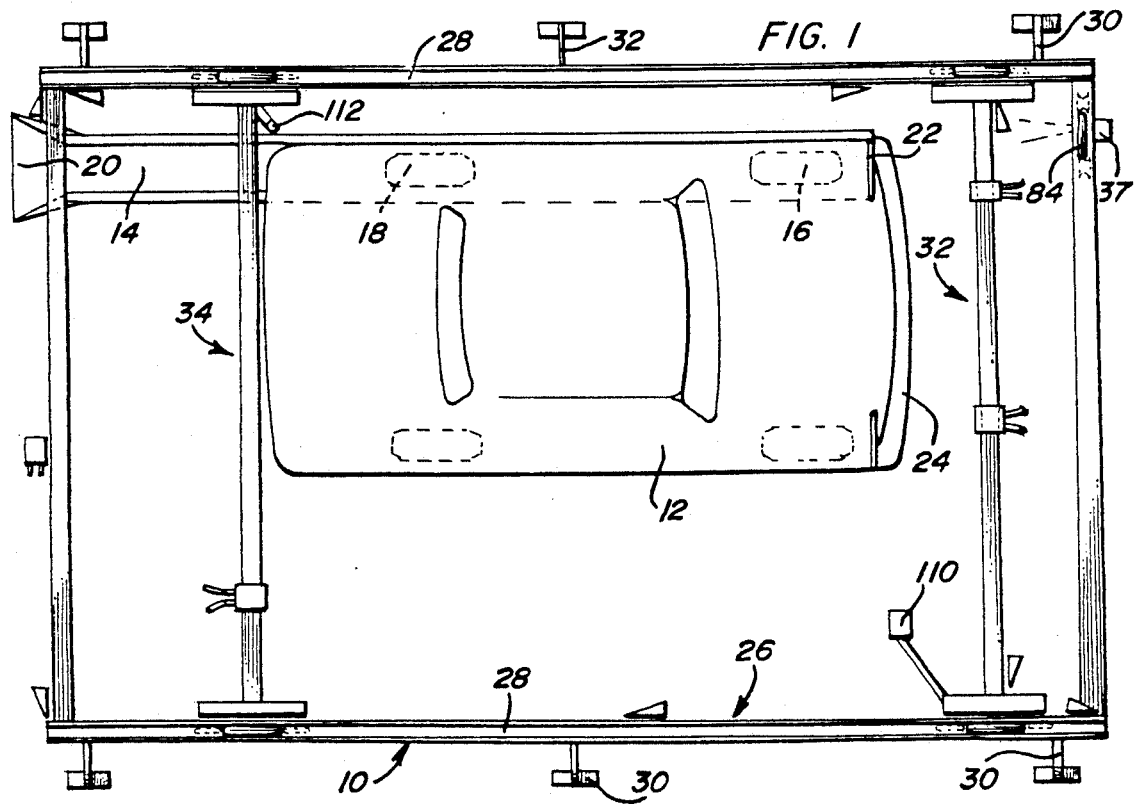
FIG. 1 is a schematic plan view illustrating the car or vehicle washing apparatus of the present invention.

Referring now specifically to the drawings, the car or vehicle washing apparatus of the present invention is generally designated by the numeral 10 and is useful in washing the external surface of various sizes of vehicles 12 such as passenger cars. The apparatus is oriented in an enclosure such as a building of conventional construction having an opening to enable the vehicle 12 to be driven into and out of the car washing apparatus. The apparatus 10 includes a longitudinal guide 14 which may be in the form of a trough-like structure or a curb for engaging and guiding the front and rear wheels 16 and 18 adjacent one side of the vehicle 12 as illustrated in FIG. 1 so the vehicle 12 will be oriented with one side thereof in predetermined spaced relation to the car washing apparatus and all vehicles will have the wheels on one side thereof engaged with the guide 14 to properly position one side of the vehicle, such as the driver's side, in relation to the car washing apparatus. The vehicle operator can observe the guide 14 and orient the wheels 16 and 18 on the driver's side of the vehicle so they engage the guide 14. As indicated, the guide 14 may be a trough-like structure with an entrance ramp or guide 20 at the entrance end thereof and a stop or limit device 22 at the opposite end thereof for engagement by the front wheels 16 thereby positioning the front end 24 of the vehicle in predetermined relation to the front end of the car washing apparatus so there will be a predetermined spatial relationship of the driver's side and front end of the vehicle 12 with the car washing apparatus 10.

Figure 2:
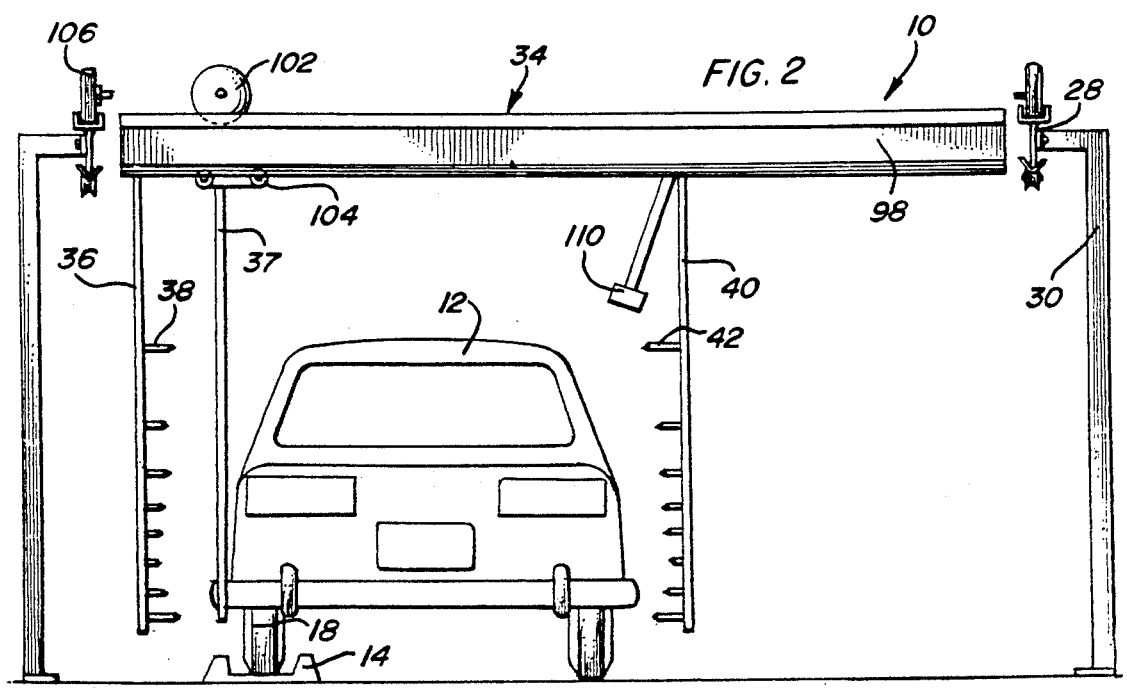
FIG. 2 is an end view of the structure illustrated in FIG. 1.

The car washing apparatus 10 includes a supporting framework 26 which is stationary in nature and may be a free standing self-supporting frame or the frame may be rigidly affixed to the building structure in any suitable manner with the framework including at least two longitudinal, horizontal, parallel tracks 28 defining the side limits of the car washing apparatus. As illustrated in FIG. 1, the guide for wheels 16 and 18 is located in parallel and predetermined spaced relation to the vertical plane of one of the tracks 28. As indicated, the tracks 28 may be supported by any suitable bracket structure 30 or the like and may have interconnecting components extending therebetween for rigidity if desired. Movably supported on the side tracks 28 is a front wash bridge 32 and a rear wash bridge 34 with the details of these bridges being illustrated more specifically in FIGS. 4 and 5. The front wash bridge 32 includes a vertically disposed spray boom or wand 36 stationarily supported adjacent one end thereof for movement longitudinally of the side of the vehicle 12 so the driver's side of the vehicle 12 will be washed by a plurality of spray nozzles 38 vertically spaced along the length of the wand 36 as the front bridge 32 moves rearwardly and then back forwardly from the front end of the vehicle 12 to the rear end thereof. Also mounted on the front bridge 32 is a laterally movable depending spray boom or wand 40 having a plurality of vertically spaced discharge nozzles 42 supported thereon with the wand or spray boom 40 being moved laterally of the car washing apparatus to a position adjacent to but spaced from the side of the vehicle 12 opposite the driver's side so the nozzles 42 will be oriented in optimum spaced relation to the side of the vehicle 12 opposite the driver's side and in generally the same spaced relation as the nozzles 38 are to the driver's side as illustrated in FIG. 2. Then, when the front wash bridge 32 is moved to the rear and then forwardly in relation to the vehicle 12, both sides of the vehicle will be simultaneously washed to the same degree since the liquid cleaning solution discharged from the nozzles 38 and 42 at a high pressure will clean the side surfaces of the vehicle 12. The rear wash bridge 34 includes a depending spray boom or wand 44 that moves laterally of the rear wash bridge 34. The rear wash bridge 34 itself is movable longitudinally along the tracks 20 so the wand 44 and the nozzles 46 thereon will be oriented in closely spaced relation to the rear of the vehicle so the rear surface of the vehicle will be efficiently cleaned by bringing the nozzles 46 into optimum spaced relation to the rear surfaces of the vehicle and moving those nozzles transversely from a point adjacent the driver's side of the vehicle to the opposite side thereof and back to the initial position.

Thus, the boom or wand 44 will effectively clean the rear surface of the vehicle, the boom or wand 36 will effectively clean the driver's side of the vehicle and the boom 40 will effectively clean the opposite side of the vehicle from the driver's side. Also, the front wash bridge 32 includes a rotatable spray nozzle arrangement generally designated by numeral 48 which cleans the top surfaces of the vehicle as the front wash bridge moves from the front to the rear of the vehicle and then back to its initial position at the front.

The front wash bridge 32 includes a supporting framework 50 journaling an elongated power shaft 52 which has a rubber wheel or tire 54 on each end thereof engaging the top flange 56 of the track 28 which also includes a vertical web 58 and a V-shaped bottom flange 60 engaged by a pair of spaced rubber wheels or tires 62 having a V-shaped periphery corresponding with the V-shaped configuration of the flanges 60. The two longitudinally spaced V-shaped periphery wheels 62 engage the V-shaped flange 60 at spaced points on opposite sides of the contact between the periphery of the wheel 54 and the flat top surface of the flange 56 on the track 20 so the two tracks 28 accurately guide movement of the front wash bridge 32 as it moves longitudinally in relation to the vehicle. The power shaft 52 is driven from a hydraulic motor 64 located centrally of the frame structure 50 and drivingly connected to the shaft 52 by a chain and sprocket gear drive 66. The hydraulic motor 64 can be located anywhere along the length of the connecting drive shaft 52.

A hydraulically operated piston and cylinder assembly 68 is supported from the frame 50 with the cylinder 70 being connected to the frame at one end thereof by a bracket 72 and a piston rod 74 extends longitudinally therefrom and is pivotally connected to a slide member 76 supported on the frame 50 with the wand 40 depending from slide member 76 and movable longitudinally of the frame 50 when the piston and cylinder assembly 68 is expanded or contracted thereby moving the depending boom or wand 40 laterally of the vehicle so it will be oriented closely adjacent the side of the vehicle opposite the driver's side. A hydraulic motor with mechanical linkage or friction drive operatively connecting the slide member with the frame may be used in lieu of the piston and cylinder 68. Also, the drive mechanism includes a rubber wheel or tire 78 on the central portion of the shaft 52 which is in frictional engagement with a circular plate 80 having a shaft 82 depending therefrom and journaled on the frame 50 by any suitable bearing structure with the lower end of the shaft 82 having the rotatable discharge nozzle assembly 48 mounted thereon with the nozzles arranged in a manner to clean the top surfaces of the vehicle 12 as the front wash bridge 32 reciprocates to the rear and back to the front of the vehicle.

Forwardly of the front wash bridge 32, a carriage 84 is supported for movement transversely of the front of the vehicle with the carriage supporting a boom or wand 37 with the carriage including a top wheel 86 and a pair of V-shaped bottom wheels engaging the top flange 90 and bottom V-shaped flange 92 on a stationary transverse track 94 which is the same as the structure for supporting the front wash bridge 32 from the tracks 28 so the wand 37 will move transversely of the vehicle 12 and wash the front of the vehicle as it moves. The wheel 88 is driven by a hydraulic motor connected thereto with all of the hydraulic motors being supplied hydraulic pressure from a reservoir 96 and suitable pump assembly and remotely controlled valves.

The rear wash bridge 34 also includes a transverse track 98 having a flat upper flange and a V-shaped lower flange supporting a carriage 100 having a top wheel 102 and spaced bottom V-shaped wheels 104 with the wand 44 being connected and supported therefrom with the top wheel 102 being driven by a hydraulic motor in order to move the carriage 100 and thus the boom or wand 44 transversely across the rear of the vehicle. The rear wash bridge 34 including the track 98 and its associated structure is movable longitudinally on the side tracks 28 by virtue of a top wheel 106 engaging each top flange 50 of the track 28 and a pair of longitudinally V-shaped wheels 108 on the bottom thereof engaging each bottom V-shaped flange 60 on the side tracks 28 with the wheels 106 being driven by a hydraulic motor and drive shaft 109 that connects the top wheels on the opposite ends of the rear wash bridge 34.

With this construction, a generally rectangular area is defined by the two stationary, rigid, parallel side tracks 28 which are rigidly interconnected by the front track 94. The rear portion of the rectangular space is formed by the movable rear track 98. The boom or wand 37 which cleans the front of the vehicle is mounted for transverse or lateral movement on the front track 94. The front wash bridge 32 which includes the rotatable nozzle assembly 48 and the laterally adjustable and longitudinally moveable boom or wand 40 moves longitudinally back and forth on the side tracks 28. The rear wash bridge which includes the rear track 98 moves longitudinally on the side tracks 28 forwardly only to a position so the wand 44 is adjacent the rear of the vehicle and the wand 44 then moves transversely along the rear track 98 from end-to-end thereof. All of the movable components are driven by hydraulic motors and all of the tracks are of the same configuration and include a flat top flange, a vertical web and a V-shaped lower flange. The hydraulic motors are controlled by conventional valve structures operated remotely and in a predetermined sequence depending upon sensing devices which sense the width and length of the vehicle and move the wand 40 inwardly to a point adjacent the side of the vehicle opposite the driver's side and move the rear wash bridge 34 forwardly to a point immediately rearwardly of the rear of the vehicle 12 so the rectangular area defined by the movable wands 36, 37, 40 and 44 will closely approach the external rectangular surface areas of the vehicle defined by the front, rear and two sides of the vehicle with the driver's side and front of the vehicle being positively related to the wands 36 and 37 by virtue of the guide 14 and the limit stop 22. One such scanning device or limit device may be mounted on the front wash bridge 32 as indicated by numeral 110 to determine the width of the vehicle so the wand or boom 40 may move inwardly to a point closely adjacent the side surface of the vehicle opposite the driver's side and another scanning device 112 is mounted on the rear wash bridge 34 to sense the length of the vehicle and limit movement of the rear wash bridge 34 forwardly so the wand or boom 44 will be closely related to the rear of the vehicle.

In the sequence of operations, the front wash bridge 32 is at its foremost position and the rear wash bridge 34 is at its rearmost position and the wands 36 and 37 are at their leftmost positions along with the wand 44. The wand 40 is at its rightmost position with the hydraulic piston and cylinder assembly 68 extended. A coin control is provided for washing only or washing plus waxing which will produce the proper signals for washing only or washing and waxing with a light signal being energized to indicate to the driver to drive forward with the forward movement of the vehicle being stopped by a trip or limit device which initiates the sequence of operation with various solenoids, timers and lights operating the pumps and hydraulic motors with the two scanners determining the width and length of the vehicle, respectively, with the hydraulic motors moving the wands 40 and 44 corresponding to the scanned width and length of the vehicle. With the pumps operated and discharging high pressure liquid cleaning and/wax solution from the nozzles, the booms or wands are moved respectively transversely and longitudinally of the vehicle to wash the front, rear and both sides and the rotating nozzle assembly moves along the top of the vehicle to wash the top surfaces thereof with all surfaces being washed and/or rinsed during movement of the nozzles in both directions of movement of the nozzles relative to the surfaces of vehicle. Since vehicles have greater variance in length as compared to variance in width, it is also within the purview of this invention to adjust the washing apparatus to "fit" only the length of the vehicle as well as to "fit" only the width of the vehicle.

The specific details of the control circuits and operating trip switches and the like are not disclosed in detail since these components may vary and involve conventional components arranged in the specific manner for accomplishing the desired movement, delays and return movement to a home position with appropriate signals being provided the vehicle operator to indicate when to drive forward into the washer, when to stop and when to either drive forward from the front end of the washer or back out of the rear end. Thus, the vehicle washing unit is capable of complete automatic control without human attention and the structural features thereof provide adjustment of the vehicle washing nozzles to the surfaces of the vehicle and effective movement in relation to the surfaces of the vehicle during the washing operation.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A vehicle washing apparatus comprising a pair of horizontally disposed, parallel, laterally spaced tracks adapted to be positioned in vertical planes along opposite sides of a vehicle to be washed, a front wash bridge supported by said tracks and extending between the tracks, means moving the front wash bridge longitudinally of the tracks, a rear wash bridge extending between the tracks and movably supported thereon, means moving the rear wash bridge longitudinally of the tracks, a horizontally disposed track at the forward end portion of the longitudinal tracks and generally extending therebetween, a carriage mounted on the forward track, a carriage mounted on the front wash bridge for movement longitudinally thereon, a vertically disposed wand mounted on the carriage on the forward track for movement therewith for washing the front end of a vehicle, a vertically disposed wand with nozzle means thereon mounted on the front wash bridge for washing the side of a vehicle during longitudinal movement of the front wash bridge in relation to the vehicle, a vertically disposed wand with nozzle means mounted on the carriage on the front wash bridge for movement laterally to a point adjacent the other side of the vehicle for washing the side of the vehicle opposite the wand mounted on the front wash bridge during longitudinal movement of the front wash bridge, nozzle means on the front wash bridge between the two wands for washing the top surfaces of the vehicle when the front wash bridge moves longitudinally thereof, a vertically disposed wand and nozzle means mounted on the carriage on the rear wash bridge for movement longitudinally to a point adjacent the rear of the vehicle when the rear wash bridge moves toward the vehicle and means moving the carriage and wand on the rear wash bridge transversely between the longitudinal tracks for washing the rear surface of the vehicle with movement of the rearmost wand and the adjustable wand mounted on the front wash bridge enabling four vertically disposed wands to be oriented closely adjacent the end and side surfaces of the vehicle for efficient washing of the vehicle by discharging high pressure liquid cleaning solution from the nozzle means on the wands.

2. The apparatus as defined in claim 1 wherein each of said tracks includes a substantially flat top flange, a vertical web and a generally V-shaped bottom flange, each of the tracks being of identical shape and each of the carriages on the tracks including a top driven roller having a resilient periphery engaging the flat flange and a pair of spaced rollers corresponding in shape to the bottom flange and engaging the bottom flange.

3. The apparatus as defined in claim 2 wherein each of said wands includes a vertically disposed pipe with a plurality of nozzles mounted thereon, the laterally adjustable wand on the front wash bridge including means limiting movement of the wand inwardly toward the vehicle to a predetermined relation, the wand on the rear wash bridge including means limiting its movement toward the rear of the vehicle to a predetermined spaced relation to the rear surface thereof.

4. The apparatus as defined in claim 3 wherein a hydraulically operated power means interconnects the carriage and track on the front wash bridge for moving the adjustable wand thereon laterally of a vehicle.

5. The apparatus as defined in claim 4 wherein each of said top rollers on the carriages and on the front end rear wash bridges is powered by a hydraulic motor and drive connection.

6. The apparatus as defined in claim 5 together with a guide for the wheels on one side of the vehicle for locating one side of the vehicle in relation to the longitudinally movable wand stationarily mounted on the front wash bridge and means limiting movement of the vehicle toward the wand mounted on the front horizontal track for orienting the front and one side of the vehicle in predetermined relation to the nozzle means on the non-adjustable wands.

7. The apparatus as defined in claim 6 wherein the nozzle means on the front wash bridge between the wands includes a rotatable tube with a plurality of horizontally spaced nozzles thereon, means rotating the tube about a vertical axis with said means being powered by the hydraulic motor for moving the front wash bridge longitudinally of the longitudinal tracks.

8. The apparatus as defined in claim 7 wherein the tracks and wash bridges are oriented in elevated position above a vehicle and the vertical wands depend therefrom with the nozzles extending substantially throughout the vertical height of the vehicle.

* * * * *